United States Patent
Sugimoto et al.

(10) Patent No.: US 6,316,090 B1
(45) Date of Patent: *Nov. 13, 2001

(54) THERMOPLASTIC ELASTOMER COMPOSITION, POWDER OR PELLET OF THE SAME, AND MOLDED ARTICLE COMPRISING THE SAME

(75) Inventors: Hiroyuki Sugimoto; Yoshihiro Nakatsuji; Susumu Ejiri, all of Chiba (JP)

(73) Assignee: Sumitomo Chemical Company, Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,776

(22) Filed: Dec. 19, 1997

(30) Foreign Application Priority Data

Dec. 20, 1996 (JP) ........................ 8-341989
Dec. 20, 1996 (JP) ........................ 8-341990

(51) Int. Cl.⁷ .................................. C08L 23/00
(52) U.S. Cl. .......... 428/304.4; 525/191; 525/202; 525/217; 525/222; 525/231
(58) Field of Search .................... 525/240, 231, 525/222, 217, 202, 191

(56) References Cited

U.S. PATENT DOCUMENTS 5,191,024  3/1993  Shibata et al.
5,840,229 * 11/1998 Sugimo et al. ............... 264/142

FOREIGN PATENT DOCUMENTS

| 236244 | 2/1990 | (JP). |
| 372512 | 3/1991 | (JP). |
| 782433 | 3/1995 | (JP). |
| 9700911 | 1/1997 | (WO). |
| 9743337 | 11/1997 | (WO). |

OTHER PUBLICATIONS

Ferry et al., "Illustrations of Viscoelastic Behavior of Polymeric Systems," *Viscoelastic Properties of Polymers, Second Edition,* Chapter 2, pp. 34–58, 1969.

* cited by examiner

Primary Examiner—Helen L. Pezzuto (57) ABSTRACT

A thermoplastic elastomer composition comprising 100 parts by weight of a polyolefin resin, 5 to 250 parts by weight of a rubbery polymer and 0 to 500 parts by weight of an ethylene-α-olefin copolymer rubber, wherein a complex dynamic viscosity $\eta^*(1)$ at 250° C. is $1.5 \times 10^5$ poise or less and a Newtonian viscosity index n is 0.67 or less, and furthermore, wherein said thermoplastic elastomer composition has a specific tan δ peak, the peak temperature of which is different from that of the polyolefin resin and that of the rubbery polymer, at a temperature within the range from −70 to 30° C. in a temperature dependence curve of tan δ determined by solid dynamic viscoelasticity measurement, powder or pellet thereof, and a molded article thereof.

6 Claims, 1 Drawing Sheet

THERMOPLASTIC ELASTOMER COMPOSITION, POWDER OR PELLET OF THE SAME, AND MOLDED ARTICLE COMPRISING THE SAME

BACKGROUND OF THE INVENTION

1. Field of the Invention

The present invention relates to a thermoplastic elastomer composition, powder or pellet of the same, and a molded article comprising the same.

2. Description of the Related Art

Hitherto, a molded article having minute uneven decorations such as leather grain and stitch on its surface is used as a skin material of an interior material of an automobile, and the like. As the skin material, a vinyl chloride resin molded article of a vinyl chloride resin or a composition comprising the vinyl chloride resin as a main component is widely known. However, hydrogen chloride gas and the like are generated when such vinyl chloride resin molded articles are incinerated after the use, and induce a problem that special incinerators are required.

As those for solving such problems, a molded article of a composition comprising a polyolefin resin and an ethylene-α-olefin copolymer rubber is proposed (JP-A-05-1183 and JP-A-05-5050). However, such molded article tends to cause whitening on bending compared with the vinyl chloride resin molded article. Therefore, when the molded article is released from the mold after molding or formed into a predetermined shape, the bent portion tends to cause whitening, which results in poor appearance. Also, there is a problem that the feeling is inferior because of poor flexibility.

To solve the above described problems, the present inventors have intensively studied to develop a thermoplastic elastomer composition which scarcely causes whitening on bending and can provide a molded article excellent in flexibility. As a result, the present inventors have found that a thermoplastic elastomer composition comprising a polyolefin resin, a rubbery polymer and optionally an ethylene-α-olefin copolymer rubber, having a peak at a specific peak temperature in a temperature dependence curve of tan δ determined by a solid dynamic viscoelasticity measurement, does not cause whitening on bending and can provide a molded article excellent in flexibility. The present inventors have also found that a thermoplastic elastomer composition pellet having specific pellet physical properties can give a molded article having complicated shapes without causing neither pinholes nor wormholes and the resulting molded article has an excellent feeling. Thus, the present invention has been achieved.

SUMMARY OF THE INVENTION

An object of the present invention is to provide a thermoplastic elastomer composition which scarcely causes whitening and provides a molded article excellent in flexibility.

Another object of the present invention is to provide a thermoplastic elastomer composition powder or pellet which can easily give a molded article having a complicated shape and an excellent feeling, which scarcely causes whitening on bending.

Other objects of the present invention will become apparent from the following description.

According to the present invention, there is provided a thermoplastic elastomer composition comprising 100 parts by weight of a polyolefin resin, 5 to 250 parts by weight of a rubbery polymer and 0 to 500 parts by weight of an ethylene-α-olefin copolymer rubber, wherein said thermoplastic elastomer composition has a new tan δ peak, the peak temperature of which is different from that of the polyolefin resin and that of the rubbery polymer, at a temperature within the range from −70 to 30° C. in a temperature dependence curve of tan δ determined by solid dynamic viscoelasticity measurement.

According to the present invention, there is also provided a thermoplastic elastomer composition powder having the above described composition, a complex dynamic viscosity $\eta^*(1)$ at 250° C. of $1.5 \times 10^5$ poise or less and a Newtonian viscosity index n of 0.67 or less, wherein said thermoplastic elastomer composition has a specific tan δ peak, the peak temperature of which is different from that of the polyolefin resin and that of the rubbery polymer, at a temperature within the range from −70 to 30° C. in a temperature dependence curve of tan δ determined by solid dynamic viscoelasticity measurement.

Furthermore, according to the present invention, there is provided a thermoplastic elastomer composition pellet having a sphere-reduced average diameter of 1.2 mm or less and a bulk specific gravity of at least 0.38, which is composed of a thermoplastic elastomer composition having the above described composition, wherein a complex dynamic viscosity $\eta^*(1)$ at 250° C. is $5.0 \times 10^4$ poise or less and a Newtonian viscosity index n is 0.28 or less, and said thermoplastic elastomer composition having a specific tan δ peak, the peak temperature of which is different from that of the polyolefin resin and that of the rubbery polymer, at a temperature within the range from −70 to 30° C. in a temperature dependence curve of tan δ determined by solid dynamic viscoelasticity measurement.

DETAILED DESCRIPTION OF THE INVENTION

The polyolefin resin used in the present invention is a crystalline homopolymer or copolymer obtained by homopolymerizing an olefin or copolymerizing at least two olefins. The crystallinity is preferably at least 50%. Examples of the olefin are olefins having 2 to 8 carbon atoms, such as ethylene, propylene, butene-1 and the like. Examples of the homopolymer or copolymer are polyethylene, polypropylene, a copolymer of propylene and ethylene, a copolymer of propylene and α-olefin other than propylene, for example, butene-1, and the like. Among them, a copolymer of propylene and ethylene is preferable because a thermoplastic elastomer composition which provides a molded article with excellent heat resistance and flexibility can be obtained. The polyolefin resin may be crosslinked. A melt flow rate (value measured at 230° C. under a load of 2.16 kgf according to JIS K-7210, hereinafter referred to as "MFR") is preferably from 20 to 300 g/10 min., more preferably from 50 to 300 g/10 min., particularly from 100 to 300 g/10 min. because a molded article excellent in appearance and strength can be obtained when a molded article is produced by powder molding the powder or pellet of thermoplastic elastomer composition of the present invention.

Examples of the rubbery polymer include a conjugated diene based elastomer, a hydrogenated product thereof and the like.

The conjugated diene based elastomer is a conjugated diene polymer rubber or a conjugated diene copolymer rubber.

The conjugated diene polymer rubber is a copolymer rubber prepared by homopolymerizing a conjugated diene or copolymerizing at least two conjugated dienes, and examples of the conjugated diene include conjugated dienes having 4 to 8 carbon atoms such as butadiene, isoprene, 1,3-pentadiene, 2,3-dimethylbutadiene and the like. Examples of the conjugated diene homopolymer or copolymer rubber include polybutadiene, polyisoprene, polypentadiene, butadiene-isoprene copolymer and the like.

The conjugated copolymer rubber is a copolymer rubber of the same conjugated diene as that described above and a monomer other than the conjugated diene. Examples of the monomer other than the conjugated diene include vinyl aromatic compound, vinyl ester compounds, vinyl nitrile compound, ethylenically unsaturated carboxylic acid ester and the like. Among them, a vinyl aromatic compound is preferable.

Regarding the vinyl aromatic compound, the 1- or 2-position of a vinyl group may be substituted with an alkyl group such as methyl group and the like. Examples of the vinyl aromatic compound include vinyl aromatic compounds having 8 to 12 carbon atoms such as styrene, p-methylstyrene, α-methylstyrene and the like. Examples of the vinyl ester compound include vinyl acetate and the like. Examples of the ethylenically unsaturated carboxylic acid ester include methyl methacrylate, ethyl methacrylate, methyl acrylate, ethyl acrylate, butyl acrylate and the like. Examples of the vinyl nitrile compound are acrylonitrile, methacrylonitrile and the like.

Examples of the conjugated diene copolymer rubber include conjugated diene-vinyl aromatic compound copolymer rubbers such as a butadiene-styrene copolymer rubber, an isoprene-styrene copolymer rubber, a butadiene-p-methylstyrene copolymer rubber and the like; conjugated diene-vinyl ester compound copolymer rubbers such as a butadiene-methyl methacrylate copolymer rubber, a butadiene-methyl acrylate copolymer rubber and the like; and conjugated diene-vinyl nitrile compound copolymer rubbers such as a butadiene-acrylonitrile copolymer rubber and the like.

The hydrogenated product of conjugated diene based elastomer (hereinafter, sometimes referred to as "hydorogenated conjugated diene based elastomer") includes a hydrogenated conjugated diene polymer rubber and a hydrogenated conjugated diene copolymer rubber prepared by hydrogenating the above conjugated diene polymer rubber or a conjugated diene copolymer rubber, and examples of the hydrogenated conjugated diene rubbery polymer include hydrogenated ones of the above conjugated diene rubbery polymers.

These rubbery polymers can be produced by a method described in JP-A-02-36244, JP-A-03-72512, JP-A-07-118335 or the like.

In the conjugated copolymer rubber or hydrogenated conjugated diene copolymer rubber, the content of the monomer unit other than the conjugated diene is preferably 50% by weight or less because a molded article having an excellent flexibility is obtained.

When the hydrogenated conjugated diene based rubbery polymers is used as the rubbery polymer, the proportion of the number of hydrogenated conjugated diene units having a side chain with at least two carbon atoms to the total number of hydrogenated conjugated diene units is preferably at least 45%, more preferably from 60 to 95%, particularly preferably from 70 to 90%, because the thermoplastic elastomer composition of the present invention is easily obtained. The proportion can be determined by $^1$H-NMR measurement.

MFR of the rubbery polymer is preferably at least 5 g/10 min., more preferably at least 10 g/10 min., because a molded article excellent in strength can be obtained when the molded article is produced by powder molding the powder or pellet of the thermoplastic elastomer composition of the present invention.

The rubbery polymers may be used alone or in combination thereof, and the content is within the range from 5 to 250 parts by weight, preferably from 10 to 150 parts by weight per 100 parts by weight of the polyolefin resin.

The thermoplastic elastomer composition of the present invention may contain an ethylene-α-olefin copolymer rubber. When the ethylene-α-olefin copolymer rubber is contained, a thermoplastic elastomer composition having a lower brittle temperature, in other words, an excellent cold resistance, is provided, favorably.

The ethylene-α-olefin copolymer rubber is a copolymer of ethylene and α-olefin, or a copolymer of ethylene, α-olefin and non-conjugated diene, which is a polymer having little crystallinity or a crystallinity of less than 50%. Examples of the α-olefin include α-olefins having 3 to 10 carbon atoms such as propylene, 1-butene, 3-methyl-1-butene and the like. Examples of the non-conjugated diene include non-conjugated dienes having 5 to 15 carbon atoms, such as dicyclopentadiene, 2-ethylidene-5-norbornene, 1,4-hexadiene, 1,5-cyclooctadiene, 2-methylene-5-norbornene and the like. Examples of the ethylene-α-olefin copolymer rubber include an ethylene-propylene copolymer rubber, an ethylene-propylene-2-ethylidene-5-norbornene copolymer rubber (hereinafter, referred to as "EPDM") and the like. The ethylene-α-olefin copolymer rubber may be crosslinked.

The content of the ethylene-α-olefin copolymer rubber is within the range from 0 to 500 parts by weight, preferably 20 to 200 parts by weight per 100 parts by weight of the polyolefin resin.

The thermoplastic elastomer composition of the present invention can be produced, for example, by melt-kneading the polyolefin resin, the rubbery polymer and optionally the ethylene-α-olefin copolymer rubber.

When the ethylene-α-olefin copolymer rubber is crosslinked, the thermoplastic elastomer composition is produced either by kneading the uncrosslinked ethylene-α-olefin copolymer rubber, the polyolefin resin and a crosslinking agent to effect dynamic crosslinking followed by adding a rubbery polymer by kneading, or kneading the uncrosslinked ethylene-α-olefin copolymer rubber, the polyolefin resin, the rubbery polymer and a crosslinking agent to effect dynamic crosslinking.

Examples of the crosslinking agent include organic peroxides such as 2,5-dimethyl-2,5-di(t-butylperoxy) hexane and the like. The amount of the crosslinking agent is usually 1 part by weight or less, preferably 0.8 part by weight or less per 100 parts by weight of the total weight of the ethylene-α-olefin copolymer rubber and the polyolefin resin.

When the dynamic crosslinking is performed by using the crosslinking agent in the presence of a crosslinking aid, the ethylene-α-olefin copolymer is suitably crosslinked, and a thermoplastic elastomer composition excellent in heat resistance and melt flow property, can be obtained.

Examples of the crosslinking aid include a bismaleimide compound and the like, and the amount of the crosslinking aid used is usually 1.5 parts by weight or less, preferably 0.8 parts by weight or less per 100 parts by weight of total weight of the ethylene-α-olefin copolymer rubber and the polyolefin resin. When the crosslinking aid is used, the amount of the crosslinking agent used is usually 0.8 part by weight or less, preferably 0.6 part by weight or less, per 100 parts by weight of the total weight of the ethylene-α-olefin copolymer rubber and the polyolefin resin.

In the dynamic crosslinking, the components may be kneaded with heating at the temperature of from 150 to 250° C. using a kneader such as a single-screw kneader, a twin-screw kneader or the like.

By the dynamic crosslinking, the ethylene-α-olefin copolymer rubber is preferentially crosslinked. The polyolefin resin is sometimes crosslinked. When the ethylene-α-olefin copolymer rubber, the polyolefin resin and the rubbery polymer are dynamically crosslinked after kneading, the rubbery polymer is sometimes crosslinked.

The thermoplastic elastomer composition of the present invention may contain various additives, for example, mineral oil softeners; thermal stabilizers such as phenol stabilizers, sulfite stabilizers, phenylalkane stabilizers, phosphite stabilizers, amine stabilizers, amide stabilizers, and the like; anti-aging agents; light stabilizers; anti-static agents; lubricants such as a metal soap, a wax and the like; internal mold release agents such as silicone compounds (e.g. a dimethylpolysiloxane compound) and the like; and pigments.

It may also contain other polymer components, for example, rubbers such as a copolymer rubber of propylene and α-olefin having at least 4 carbon atoms, natural rubber, butyl rubber, chloroprene rubber, epichlorohydrin rubber, acrylic rubber and the like, ethylene-acrylic acid copolymer, ethylene-vinyl acetate copolymer and a saponified one thereof, ethylene-methyl methacrylate copolymer, ethylene-glycidyl methacrylate-vinyl acetate copolymer, ethylene-glycidyl methacrylate-vinyl acetate copolymer and the like.

These additives and other polymer components may be previously contained either in the polyolefin resin, the rubbery polymer or the ethylene-α-olefin copolymer, or may be blended at the time of the above kneading or dynamic crosslinking or after it.

Among them, the mineral oil softener is preferably used because the thermoplastic elastomer composition containing the mineral oil softener is superior in melt flow property and can provide a molded article having an excellent flexibility.

The preferable range of a complex dynamic viscosity $\eta^*(1)$ at 250° C. of the thermoplastic elastomer composition of the present invention varies depending on the molding method adopted in the production of the molded article. For example, in the case of powder of a thermoplastic elastomer composition produced by a freeze-pulverization method described below, used for a powder molding, the complex dynamic viscosity $\eta^*(1)$ at 250° C. is preferably $1.5 \times 10^5$ poise or less, more preferably $1 \times 10^2$ to $5 \times 10^3$ poise, most preferably $3 \times 10^2$ to $3 \times 10^3$ poise from a view point of processability.

And, in a case of pellet of a thermoplastic elastomer composition produced by a solvent-treatment method, a strand-cut method or a die-face cut method described below, used for a powder molding, the complex dynamic viscosity $\eta^*(1)$ at 250° C. is preferably $5.0 \times 10^4$ poise or less, more preferably $1 \times 10^2$ to $3.0 \times 10^3$ poise, most preferably $3 \times 10^2$ to $2 \times 10^3$ poise or less from a view point of processability.

The complex dynamic viscosity $\eta^*(\omega)$ is a value calculated by using a storage modulus $G'(\omega)$ and loss modulus $G''(\omega)$ at 250° C. and at a vibration frequency of $\omega$ according to the calculation formula (1):

$$\eta^*(\omega) = \{[G'(\omega)]^2 + [G''(\omega)]^2\}^{1/2}/\omega \tag{1}$$

and the complex dynamic viscosity $\eta^*(1)$ is a complex dynamic viscosity at $\omega$ of 1 radian/second.

When the complex dynamic viscosity $\eta^*(1)$ in the each case above, exceeds the upper limit specified, the melt flow property of the thermoplastic elastomer composition becomes poor and it tends to become difficult to produce a molded article by a molding method in which the shear rate on molding is usually as low as 1 sec$^{-1}$ or less, such as the powder molding.

Further, in the case of powder of a thermoplastic elastomer composition produced by the freeze-pulverization method described below, used for a powder molding, the Newtonian viscosity index n is preferably 0.67 or less, more preferably, 0.01 to 0.35, most preferably 0.03 to 0.25 from a view point of processability.

And, in a case of pellet of a thermoplastic elastomer composition produced by the solvent-treatment method, strand cut method or die-face cut method described below, used for a powder molding, the Newtonian viscosity index n is preferably 0.28 or less, more preferably 0.01 to 0.25, most preferably 0.03 to 0.20.

Herein, the Newtonian viscosity index n is a value calculated by using the above complex dynamic viscosity $\eta^*(1)$ and a complex dynamic viscosity $\eta^*(100)$ measured at 250° C. and a vibration frequency $\omega$ of 100 radian/second according to the formula (2):

$$n = \{\log \eta^*(1) - \log \eta^*(100)\}/2 \tag{2}$$

When the Newtonian viscosity index n exceeds each upper limit, the mechanical strength of the resulting molded article tends to become very poor, unfavorably.

To produce the thermoplastic elastomer composition of the present invention which satisfies the values of physical properties represented by the above complex dynamic viscosity and the Newtonian viscosity index, the degree of the kneading and dynamic crosslinking, the kind and amount of the respective components constituting the thermoplastic elastomer composition, the kinds and amounts of the crosslinking agent and crosslinking aid in the dynamic crosslinking, and the kinds and amounts of the additives are suitably selected.

Among them, the influence of the shear rate in the kneading and dynamic crosslinking exerted on the above values of physical properties is large, and the kneading and dynamic crosslinking is preferably performed at the shear rate of at least $1 \times 10^3$ sec$^{-1}$.

It is necessary that the thermoplastic elastomer composition of the present invention has a specific tan δ peak, the peak temperature of which is different from that of the polyolefin resin and that of the rubbery polymer, at the temperature within the range from −70 to 30° C. in a temperature dependence curve of tan δ determined by solid dynamic viscoelasticity measurement.

The solid viscoelasticity can be measured by using a conventional solid viscoelasticity measuring apparatus.

The peak temperature of the specific tan δ peak may be only different from that of the polyolefin resin and that of the rubbery polymer, but furthermore, is usually lower than the peak temperature of the polyolefin resin.

When the thermoplastic elastomer composition doesn't have a specific peak, the molded article tends to cause whitening easily when it is bent. To obtain the effect sufficiently, the peak intensity of the new peak is preferably at least 0.05.

The molded article obtained by molding the thermoplastic elastomer composition of the present invention doesn't easily cause whitening, but the method for producing the molded article is not specifically limited, and examples thereof include powder molding, press molding, extrusion molding, injection molding, vacuum molding and the like.

In the production of the molded article, the composition of the present invention is used after previously forming into pellet, powder or the like. To produce a molded article by powder molding, powder of the thermoplastic elastomer composition of the present invention may be subject to powder molding.

As the method for forming the thermoplastic elastomer composition into powder, various methods can be used. It is possible to produce the powder easily by a freeze-pulverization method, wherein the thermoplastic elastomer composition is cooled below the glass transition temperature, preferably −70° C. or less, more preferably −90° C. or less, and ground in such a cooled state. When the thermoplastic elastomer composition is ground at the temperature higher than the glass transition temperature, the particle size distribution of the obtained powder tends to become broad and it becomes difficult to perform powder molding. To grind while maintaining the cooled state of the thermoplastic elastomer composition, it is preferable to grind by a method which has a good pulverization efficiency and cooling efficiency. For example, a mechanical pulverization method using an impact grinder such as a ball mill or the like is used. The powder obtained by this method has a particle size enough to pass a Tyler standard sieve of 24 mesh (opening of 700 $\mu$m×700 $\mu$m), preferably 28 mesh (opening of 590 $\mu$m×590 $\mu$m).

In the case of pellet of the thermoplastic elastomer composition produced by the solvent-treatment method, strand cut method or die-face cut method described below, when pellet, having a sphere-reduced average diameter of 1.2 mm or less and a bulk specific gravity of at least 0.38, is used for powder molding, there can be obtained a molded article having a complicated shape such as a convex portion and being free from a drawback such as wormholes, pinhole and the like.

Herein, the sphere-reduced average diameter means a particle diameter calculated as the diameter of a sphere which has the same volume as an average volume of the pellet of the thermoplastic elastomer composition. The average volume of the particles is a value obtained by calculating from the total weight of a hundred pellets of the arbitrary selected thermoplastic elastomer composition and the density of the thermoplastic elastomer composition, and is preferably 1.0 mm or less. When the sphere-reduced average diameter exceeds 1.2 mm, heat fusion of the pellet on powder molding becomes insufficient, and the resulting molded article has pinholes or wormholes.

The bulk specific gravity is a value calculated from the weight of 100 ml of the pellet of the thermoplastic elastomer composition fed to a container for measuring bulk specific gravity from a funnel for measuring bulk specific gravity according to JIS K-6721, and is preferably at least 0.42. When the bulk specific gravity is less than 0.38, adhesion of the pellet onto the molding surface in the powder molding tends to become insufficient and the molded article tends to have pinholes or wormholes, which results in poor appearance.

The thermoplastic elastomer powder having such powder physical properties can be easily produced, for example, by a method of melting a thermoplastic elastomer composition with heating, extruding the molten thermoplastic elastomer composition from a die to form a strand, drawing an extruded strand or drawing it with stretching, followed by cooling and cutting (hereinafter referred to as "strand-cut method" (for example, JP-A-50-149747)), a method of grinding a thermoplastic elastomer composition at the temperature lower than the glass transition point, and treating the ground thermoplastic elastomer composition with a poor solvent to form spheres (hereinafter referred to as "solvent-treatment method" (for example, JP-A-62-280226)) and a method of melting a thermoplastic elastomer composition with heating, extruding the molten thermoplastic elastomer composition into water and cutting it immediately after passing through a discharge opening of the die (hereinafter referred to as "die-face cut method").

In case of producing by the strand-cut method, a diameter of a discharge opening of the die is usually within the range from 0.1 to 3 mm, preferably from 0.2 to 2 mm. A discharge rate from the die is usually within the range from 0.1 to 5 kg/hour/opening, preferably from 0.5 to 3 kg/hour/opening. A haul-off rate of a strand is usually within the range from 1 to 100 m/min., preferably from 5 to 50 m/min. A cut length after cooling is usually 1.4 mm or less, preferably 1.2 mm or less.

When the pellet is produced by the solvent-treatment method, the thermoplastic elastomer composition is ground at a temperature lower than its glass transition point, usually −70° C. or less, preferably −90° C. or less, and then solvent-treated. The term "solvent treatment" used herein means a method of heating the ground thermoplastic elastomer composition in a solvent which has a low compatibility with the thermoplastic elastomer in the presence of a dispersant and an emulsifier to the temperature higher than a melt temperature of thermoplastic elastomer composition, preferably higher than the melt temperature by 30 to 50° C. to form spheres, followed by cooling and removing.

Examples of the medium used in the solvent treatment include ethylene glycol, polyethylene glycol, polypropylene glycol and the like, and the amount is within the range from 300 to 1000 parts by weight, preferably from 400 to 800 parts by weight, per 100 parts by weight of the thermoplastic elastomer composition to be used.

Examples of the dispersant include ethylene-acrylic acid copolymer, silicic anhydrate, titanium oxide and the like, and the amount is usually within the range from 5 to 20 parts by weight, preferably from 10 to 15 parts by weight, per 100 parts by weight of the thermoplastic elastomer composition.

Examples of the emulsifier include polyoxyethylene sorbitan monolaurate, polyethylene glycol monolaurate, sorbitan tristearate and the like but are not limited thereto. The amount is usually within the range from 3 to 15 parts by weight, preferably from 5 to 10 parts by weight, per 100 parts by weight of the thermoplastic elastomer composition.

In case of producing by the die-face cut method, a diameter of a discharge opening is usually within the range from 0.1 to 3 mm, preferably from 0.2 to 2 mm. A discharge rate from a die is usually within the range from 0.1 to 5 kg/hour/opening, preferably from 0.5 to 3 kg/hour/opening.

A molded article obtained by molding the powder or the pellet of the thermoplastic elastomer composition, which satisfies the above conditions, scarcely causes whitening. As the molding method, a powder molding is suitable, but the other methods such as a press molding, an extrusion molding, an injection molding, a vacuum forming and the like can also be applied.

Since the above powder or the pellet of the thermoplastic elastomer composition can be easily molten by heat supplied from the mold even at low shear rate and a low molding pressure as in case of powder molding method, the powder can be easily molded into various shapes. Examples of the powder molding method include a fluidization dip method, an electrostatic coating method, a powder spray method, a powder rotational molding method, a powder slush molding method and the like.

To perform powder molding the powder or pellet of the thermoplastic elastomer composition, for example, a mold whose molding surface may be provided with a complicated pattern is heated to a temperature higher than the melt temperature of the thermoplastic elastomer composition, and then powder or pellet of the thermoplastic elastomer composition is fed onto the molding surface of the mold. The powder or the pellet is molten and adhered each other to obtain a sheet-like melt on the molding surface and the excess amount of unadhered powder or the pellet is dropped off from the mold. After dropping off the powder or the pellet, the mold may be further heated. Then, the mold is cooled, and the molded article is released from the mold.

Examples of the heating method of the mold include a gas heating furnace method, a heat transfer medium-circulation method, a dipping system into a heat transfer medium oil or a heated fluidized sand, a microwave induction heating system and the like.

A mold temperature in case of heat-fusing the powder onto the mold is usually within the range from 150 to 300° C., preferably from 190 to 270° C. A time period of slushing the powder or the pellet onto the molding surface of the mold is not particularly limited and properly selected depending on the size and thickness of the molded article.

A foamed material having an excellent flexibility can be produced by molding the thermoplastic elastomer composition containing a foaming agent. The method for producing such molded article is not specifically limited, and examples thereof include powder molding, press molding, extrusion molding, injection molding and the like.

For example, to produce a foamed article by the powder molding, powder of the thermoplastic elastomer composition powder containing a foaming agent may be foamed after powder molding.

As the foaming agent, a thermal decomposition type foaming agent is usually used. Examples of the thermal decomposition type foaming agent include azo compounds such as azodicarbonamide, 2,2'-azobisisobutyronitrile, diazodiaminobenzene and the like; sulfonyl hydrazide compounds such as benzenesulfonyl hydrazide, benzene-1,3-sulfonyl hydrazide, p-toluenesulfonyl hydrazide and the like; nitroso compounds such as N,N'-dinitrosopentamethylenetetramine, N,N'-dinitroso-N,N'-dimethylterephthalamide and the like; azide compounds such as teraphthalazide and the like; and carbonates such as sodium hydrogencarbonate, ammonium hydrogencarbonate, ammonium carbonate, and the like. Among them, azodicarbonamide is preferably used.

Examples of the method for producing the powder or the pellet of the thermoplastic elastomer composition containing the foaming agent include a method of mixing a foaming agent with powder or pellet of thermoplastic elastomer composition, and a method of previously kneading a thermoplastic elastomer composition with a foaming agent at a temperature lower than its decomposition temperature of the foaming agent, followed by grinding by the above method. A foaming aid, a cell adjuster and the like may be mixed, together with the foaming agent.

The molded article obtained by molding the thermoplastic elastomer composition of the present invention is useful as a skin material, and a two-layer molded article obtained by laminating a foamed layer on one surface of the molded article may also be used as the skin material. Such two-layer molded article can be integrally produced by powder molding method (for example, JP-A-05-473) and may also be produced by bonding a separately produced foamed material to the above obtained molded article using a bonding agent.

To produce the two-layer molded article by the powder molding, for example, a mold whose molding surface may be provided with a complicated pattern is heated to a temperature higher than the melt temperature of the thermoplastic elastomer composition, and then the above described powder or the pellet of thermoplastic powder is fed on the molding surface of the mold, and the powder or the pellet is molten and adhered each other to obtain a sheet-like melt on the molding surface. After the unadhered excess powder or pellet is removed, powder or pellet of the thermoplastic polymer composition containing a foaming agent are fed on this sheet-like melt and the powder is adhered and molten each other to obtain a sheet-like melt on the molding surface. Then, the unadhered excess powder or pellet is removed, followed by heating and foaming to form a foamed layer.

It is also possible to form a composite molded article composed of an unfoamed layer, a foamed layer and an unformed layer by the powder molding method. In this case, unfoamed layers may be the same or different. Examples of the foaming agent include the same thermal decomposition type foaming agents as those described above. Examples of the polymer component in the thermoplastic polymer composition containing the foaming agent include a vinyl chloride resin, a polyolefin resin, an olefin thermoplastic elastomer and the like. It is also possible to use a foamable polyethylene composition disclosed as a thermoplastic polymer composition containing the foaming agent in JP-A-07-228720.

As the foamed layer, a polyurethane foam can also be used. In this case, since it tends to be inferior in adhesion between the thermoplastic elastomer composition of the present invention and polyurethane, the adhesion can be improved by pre-treating the surface of the molded article to be adhered, with a primer such as chlorinated polyethylene or the like.

The polyurethane foamed layer can be molded by fixing the above molded article and a core material described hereinafter to the predetermined position with providing a constant distance, pouring a previously mixed liquor of a polyol and a polyisocyanate, followed by foaming under pressure.

The molded article or two-layer molded article is suitable as a skin material to be laminated on a thermoplastic resin core material. For example, the above molded article can be used as a material for producing a multi-layer molded article by laminating the thermoplastic resin core material on one surface thereof. The two-layer molded article can be used as a material for producing a multi-layer molded article by laminating the thermoplastic resin core material on the foamed layer thereof.

As the thermoplastic resin core material, for example, there can be used polyolefin resins such as polypropylene, polystyrene and the like; and thermoplastic resins such as ABS resin (acrylonitrile-butadiene-styrene copolymer) and the like. Among them, polyolefin resins such as polypropylene are preferably used.

The multi-layer molded article can be easily produced, for example, by a method of feeding a thermoplastic resin melt on one surface of the molded article, followed by pressing, or a method of feeding a thermoplastic resin melt on the foamed layer side of the two-layer molded article, followed by press molding.

The thermoplastic resin melt means a thermoplastic resin in the molten state by heating to a temperature higher than its melt temperature. The thermoplastic resin melt may be fed before or on pressing. The pressing may be performed by using a mold, or performed by a feeding force of the thermoplastic resin melt. Examples of the molding method include an injection molding method, a low-pressure injection molding method, a low-pressure compression molding method and the like.

For example, in case of using the above molded article as a skin material, the molded article is fed between a pair of opened molds, and then both molds may be clamped after or while feeding a thermoplastic resin melt between one surface of the molded article and one mold which is opposite to the surface. In case of using a two-layer molded article as the skin material, the two-layer molded article is fed between a pair of opened molds, and then both molds may be clamped after or while feeding a thermoplastic resin melt between the foamed layer of the molded article and one mold which is opposite to the foamed layer. The opening/closing direction of both molds is not specifically limited, and may be a vertical direction or a horizontal direction.

When using the molded article or two-layer molded article produced by using the above mold for powder molding as a skin material, the mold for powder molding method can be used as one mold in the production of the above multi-layer molded article while holding the molded article or two-layer molded article on the molded surface. According to this method, since the molded article or two-layer molded article to which a pattern of the mold is transferred is fed between the molds without being separated from the molds, a desired multi-layer molded article can be obtained without damaging the pattern provided on the surface.

The thermoplastic resin melt can be fed after the completion of the clamping, but both molds are preferably clamped while or after feeding when both molds are not closed, because there can be obtained a multi-layer molded article wherein the molded article or two-layer molded article scarcely shifts and a transfer degree of the pattern is improved. The method of feeding the thermoplastic resin melt is not specifically limited, and the thermoplastic resin melt can be fed through a resin passage provided in one mold which is opposite to the molded article or two-layer molded article. A feeding nozzle of the molten resin is inserted between both molds and the molten resin is fed, and then the feeding nozzle may be removed out of the system to close both molds.

As a pair of molds, there can be used a pair of male/female molds wherein the outer periphery of the first mold member and inner periphery of the second mold member are capable of sliding. In this case, by setting a clearance in sliding surface between molds to almost the same value as that of a thickness of the molded article or two-layer molded article, a multi-layer molded article having an excess skin material at the edge portion can be obtained. A multi-layer molded article whose edge portion is coated with the skin material can be produced by turning up this excess skin material to the back surface of the multi-layer molded article.

The thermoplastic elastomer composition of the present invention scarcely causes whitening on bending, and can provide a molded article having an excellent flexibility.

EXAMPLES

The present invention will be illustrated by the following Examples, but is not limit thereto.

The thermoplastic elastomer composition and molded article were evaluated as follows:
(1) Complex dynamic viscosity η*(1) and Newtonian viscosity index n A storage modulus G'(ω) and a loss modulus G"(ω) are measured at a vibration frequency ω of 1 radian/sec. or 100 radian/sec. by using a dynamic spectrometer (RDS-7700 manufactured by Rheometrix Inc.), and then η*(1) and η*(100) are calculated by the above described calculation formula (1). The measurement is conducted at an applied strain of 5% and a sample temperature of 25° C. in a parallel plate mode.

The Newtonian viscosity index n is determined by the above described calculation formula (2) using η*(1) and η*(100).
(2) Proportion of the number of hydrogenated conjugated diene units having a side chain with at least two carbon atoms to the total number of hydrogenated conjugated diene units in the hydrogenated conjugated diene copolymer rubber It is determined by $^1$H-NMR measurement (400 MHz) using a o-xylene-d10 solution of hydrogenated conjugated diene copolymer rubber the at the concentration of 1.6 mg/ml.
(3) Sphere-reduced average diameter An average volume per one particle is calculated form the total weight of arbitrarily selected 100 particles and a specific gravity. Then, a diameter of a sphere having the same volume as that average volume is calculated, and used as a sphere-reduced average diameter.
(4) Bulk specific gravity 100 ml of powder or pellet of thermoplastic elastomer composition is collected and weighed, and a bulk specific gravity is calculated according to JIS K-6721.
(5) Flexibility of molded article After cutting the molded article into pieces of 1 cm×5 cm, ten pieces are piled and a Shore A-scale hardness of the resulting laminate is determined according to JIS K-6301.
(6) Whitening on bending The molded article was cut into pieces of 1 cm×5 cm and bent by applying a bending load of 500 g or 1 kg for a minute. After removing the load, the evaluation is conducted on the basis of the width of the portion whitened on bending according to the following criteria:

1: Width of the whitened portion is 2 mm or more.
   2: Width of the whitened portion is 1 mm or more and less than 2 mm.
   3: Width of the whitened portion is less than 1 mm.
   4: No whitened portion is recognized.
(7) Solid viscoelasticity Using a solid viscoelasticity measuring apparatus (SDM 5600H manufactured by Seiko Instrument Inc.), DS200 (tension mode) is employed. A sample of 1 cm×10 cm×1 mm in thickness is made by a press molding and the measurement is conducted by vibrating the sample within the range from −150 to 130° C. at a heating rate of 2° C./min., a vibration frequency of 10 Hz and a vibration amplitude of 25 μm to determine a peak temperature and an intensity of tan δ peak.

(8) Appearance of molded article

Figure 1:
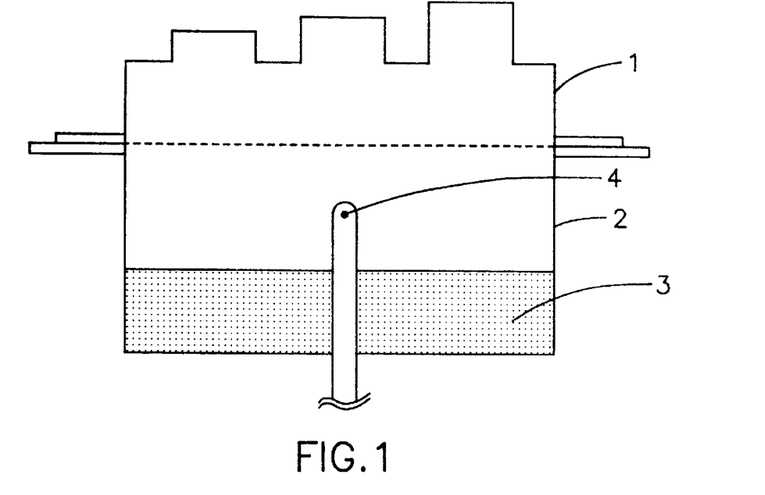
FIG. 1 is a cross sectional view of an example of a slush molding apparatus in which a container containing a thermoplastic elastomer composition powder for powder slush molding and a mold for slush molding are in an integrated state.

In the powder slush molded article, presence of pinholes or wormholes at each edge of three protrusions A (7 mm in height×25 mm in width), B (11 mm in height×25 mm in width) and C (15 mm in height×25 mm in width) shown in FIG. 1 is observed by naked eyes, and the results were evaluated according to the following criteria.

1: Pinhole and underfill are found at the edges of the protrusions A, B and C.
2: Neither pinhole nor underfill is found at the edges of the protrusion A, but pinholes and underfill are found at the edges of the protrusions B and C.
3: Neither pinhole nor underfill is found at the edges of the protrusions A and B, but pinholes and underfill are found at the edges of the protrusion C.
4: Neither pinhole nor underfill is found at the edges of the protrusions A, B and C.

Reference Example 1

To EPDM (propylene unit content=28% by weight, iodine value=12) of 100 parts by weight, 100 parts by weight of a mineral oil base softener (DIANA PROCESS (trademark) PW-380 manufactured by Idemitsu Kosan Co., Ltd.) was added to obtain an oil-extended EPDM. 50 parts by weight of the oil-extended EPDM and 50 parts by weight of an ethylene-propylene random copolymer resin (peak temperature of tan δ peak=−2° C., intensity=0.2, ethylene unit content=5% by weight, MFR=90 g/10 min.) and 0.4 part by weight of a bismaleimide compound as a crosslinking aid (SUMIFINE (trademark) BM manufactured by Sumitomo Chemical Co., Ltd.) were melt-kneaded using a Banbury mixer for 10 minutes and then formed into granule using an extruder to obtain a master batch.

To the master batch (100 parts by weight), 0.1 parts by weight of 2,5-dimethyl-2,5-di(t-butylperoxyno)hexane as an organic peroxide (SUNPEROX (trademark) APO manufactured by Sanken Kako Co., Ltd.) was added and kneaded in a twin-screw extruder (TEX-44, manufactured by Nippon Steel Works, Ltd.) at 220° C. to effect dynamic crosslinking to obtain a thermoplastic elastomer composition, which had $\eta^*(1)$ of $5.2 \times 10^3$ poise and n of 0.31. The thermoplastic elastomer composition was cut by a cutter to obtain granule.

EPDM in this composition had a peak temperature (of tan δ peak) of −45° C. and an intensity of 0.12.

Example 1

The granule (100 parts by weight) obtained in Reference Example 1 and, as a hydrogenated conjugated diene copolymer rubber, a hydrogenated butadiene-styrene copolymer (styrene unit content=10 % by weight, hydrogenation rate=99%, $\eta^*(1)=8.3 \times 10^3$ poise, n=0.16, MFR=10 g/10 min., proportion of hydrogenated conjugated diene units having a side chain of at least two carbon atoms to hydrogenated total conjugated diene units=71%, peak temperature of tan δ peak=−22° C., intensity=1.5) (20 parts by weight) were kneaded and molten with a 40 mm φ extruder at 180° C. to obtain a thermoplastic elastomer composition, which was cut by a cutter to obtain granule.

This granule was cooled to −120° C. by using liquid nitrogen and then pulverized while maintaining a cooled state to obtain a powder passing through a Tyler standard sieve of 32 mesh (opening of 500 μm×500 μm), of the thermoplastic elastomer composition.

The resulting powder (1000 g) of the thermoplastic elastomer composition was fed on the molding surface of a nickel-electroplated mold (30 cm×30 cm×3 mm in thickness. Previously heated to 250° C. (surface temperature) for fourteen seconds, unadhered excess powder was dropped off from the mold. Thereafter, the resultant was heated in an oven at 250° C. for 60 seconds, cooled and then released from the mold to obtain a sheet-like molded article having a thickness of 1 mm. The evaluation results of the thermoplastic elastomer composition and molded article are shown in Table 1.

Example 2 and Comparative Example 1

In the same manner as in Example 1 except for using the hydrogenated conjugated diene copolymer rubber in the amount described in Table 1, a thermoplastic elastomer composition was obtained, and then a molded article was obtained. The evaluation results of the thermoplastic elastomer composition and molded article are shown in Table 1.

Comparative Example 2

In the same manner as in Example 1 except for using an ethylene-propylene copolymer rubber [SPO V0141 manufactured by Sumitomo Chemical Co., Ltd., propylene unit content=27 % by weight, $\eta^*(1)=5.2 \times 10^4$ poise, n=0.21] (20 parts by weight) in place of the hydrogenated conjugated diene copolymer rubber, a thermoplastic elastomer composition was obtained, and then a molded article was obtained. The evaluation results of the thermoplastic elastomer composition and molded article are shown in Table 1.

Reference Example 2

A propylene-ethylene copolymer resin [ethylene unit content=4.5% by weight, MFR=228 g/10 min., peak temperature of tan δ peak=−2° C., intensity=0.2] (66.7 parts by weight) and an ethylene-propylene copolymer rubber [SPO V0141 manufactured by Sumitomo Chemical Co., Ltd., propylene unit content=27 % by weight, MFR=1 g/10 min.] (33.3 parts by weight) were kneaded in a twin-screw extruder at a shear rate of $1.2 \times 10^3$ sec$^{-1}$ and at 200 ° C. to obtain a composition [$\eta^*(1)=3.0 \times 10^3$ poise, n=0.12], which was cut by a cutter to obtain granule.

The ethylene-propylene copolymer rubber in this composition had a peak temperature (of tan δ peak) of −45° C. and an intensity of 0.12.

Example 3

In the same manner as in Example 1 except for using granule (100 parts by weight) obtained in Reference Example 2 in place of the granule of the composition obtained in Reference Example 1 and changing the amount of the hydrogenated conjugated diene copolymer rubber to 66.7 parts by weight, a thermoplastic elastomer composition was obtained, and then a molded article was obtained. The evaluation results of the thermoplastic elastomer composition and molded article are shown in Table 1.

Example 4

A propylene-ethylene random copolymer resin [ethylene unit content=4.5% by weight, MFR=228 g/10 min., peak temperature of tan δ peak=−2° C., peak intensity=0.2] (100 parts by weight), as hydrogenated conjugated diene copolymer rubber, a hydrogenated butadiene-styrene copolymer (styrene unit content=10% by weight, hydrogenation rate=99%, complex dynamic viscosity $\eta^*(1)=8.3 \times 10^3$ poise, Newtonian viscosity index n=0.16, MFR=10 g/10 min., proportion of hydrogenated conjugated diene units having a side chain of at least two carbon atoms to hydrogenated total conjugated diene units=71%, peak temperature of tan δ peak=−22° C., peak intensity=1.5) (10 parts by weight), and an ethylene-hexene copolymer rubber (Engage 8400, hexene content=25% by weight, MFR=30 g/10 min., manufactured by Dow Chemical Co., Ltd.) (90 parts by weight) were kneaded in a twin screw extruder at a temperature of 200° C., at a share rate of $1.2 \times 10^3$ sec$^{-1}$ to obtain a composition (complex dynamic viscosity $\eta^*(1)=9 \times 10^2$ poise, n=0.12). The extruded strand was cut by a cutter to obtain thermoplastic elastomer composition granule. Then, powder of the composition was obtained, and a molded article was obtained in the same manner as in Example 1.

Evaluation results of the thermoplastic elastomer composition and the molded article are shown in Table 2.

Example 5

A propylene-ethylene random copolymer resin [ethylene unit content=4.5% by weight, MFR=228 g/10 min., peak temperature of tan δ peak=−2° C., peak intensity=0.2] (100 parts by weight), as a hydrogenated conjugated diene copolymer rubber, a hydrogenated butadiene-styrene copolymer(styrene unit content=15% by weight, hydrogenation rate=95%, complex dynamic viscosity $\eta^*(1)=6 \times 10^3$ poise, n=0.02, MFR=65 g/10 min., proportion of hydrogenated conjugated diene units having a side chain of at least two carbon atoms to hydrogenated total conjugated diene units=60%, peak temperature of tan δ peak=−11° C., peak intensity=1.8) (100 parts by weight), and an ethylene-propylene copolymer rubber [SPO V0141 manufactured by Sumitomo Chemical Co., Ltd., propylene unit content=27% by weight, MFR=1 g/10 min.] (50 parts by weight) were kneaded in a twin-screw extruder at a temperature of 200° C., at a share rate of $1.2 \times 10^3$ sec$^{-1}$ to obtain a composition ($\eta^*(1)=9 \times 10^2$ poise, n=0.03). The extruded strand was cut by a cutter to obtain thermoplastic elastomer composition granule.

Then, powder of the composition was obtained, and a molded article was obtained in the same manner as in Example 1.

Evaluation results of the thermoplastic elastomer composition and the molded article are shown in Table 1.

Comparative Example 3

In the same manner as in Example 3 except for using no hydrogenated conjugated diene copolymer rubber, a thermoplastic elastomer composition was obtained, and then a molded article was obtained. The evaluation results of the thermoplastic elastomer composition and molded article are shown in Table 1.

Comparative Example 4

In the same manner as in Example 3 except for using an ethylene-propylene random copolymer rubber [SPO V0141 manufactured by Sumitomo Chemical Co., Ltd., propylene unit content=27% by weight, $\eta^*(1)=5.2 \times 10^4$ poise, n=0.2] (66.7 parts by weight) in place of the hydrogenated conjugated diene copolymer rubber, a thermoplastic elastomer composition was obtained, and then a molded article was obtained. The evaluation results of the thermoplastic elastomer composition and molded article are shown in Table 1.

Comparative Example 5

A propylene-ethylene random copolymer resin [ethylene unit content=4.5% by weight, MFR=228 g/10 min., peak temperature of tan δ peak=−2° C., peak intensity=0.2] (100 parts by weight), as a hydrogenated conjugated diene copolymer rubber, a hydrogenated butadiene-styrene copolymer(styrene unit content=10% by weight, hydrogenation rate=99%, complex dynamic viscosity $\eta^*(1)=8.3 \times 10^3$ poise, Newtonian viscosity index n=0.16, MFR=10 g/10 min., proportion of hydrogenated conjugated diene units having a side chain of at least two carbon atoms to hydrogenated total conjugated diene units=71%, peak temperature of tan δ peak=−22° C., peak intensity=1.5) (4 parts by weight), and an ethylene-hexene copolymer rubber (Engage 8400, hexene content=25% by weight, MFR=30g/10min., manufactured by Dow Chemical Co., Ltd.) (96 parts by weight) were kneaded in a twin-screw extruder at a temperature of 200° C., at a share rate of $1.2 \times 10^3$ sec$^{-1}$ to obtain a composition (complex dynamic viscosity $\eta^*(1)=7 \times 10^2$ poise, n=0.02). The extruded strand was cut by a cutter to obtain thermoplastic elastomer composition granule. Then, powder of the composition was obtained, and a molded article was obtained in the same manner as in Example 1.

Evaluation results of the thermoplastic elastomer composition and the molded article are shown in Table 2.

TABLE 1

| | Polyolefin | | | | | Tan δ peak | | | Whitening on bending | |
| | resin (Part by weight) | HCR** (Part by weight) | EAC** (Part by weight) | $\eta^*(1)$ (poise) | n | Peak temp. (° C.) | Peak intensity | Flexibility | 500 g | 1000 g |
| --- | --- | --- | --- | --- | --- | --- | --- | --- | --- | --- |
| Example 1 | 100 | 40.2 | 101*** | $2.0 \times 10^3$ | 0.13 | −27 | 0.2 | 86 | 4 | 4 |
| Example 2 | 100 | 80.4 | 101*** | $3.6 \times 10^3$ | 0.13 | −35 | 0.32 | 82 | 4 | 4 |
| Comparative Example 1 | 100 | 0 | 101*** | $5.2 \times 10^3$ | 0.31 | | | 92 | 2 | 2 |
| Comparative Example 2 | 100 | 0 | 141*** | $2.6 \times 10^4$ | 0.38 | | | 88 | 1 | 1 |
| Example 3 | 100 | 100 | 50 | $2.7 \times 10^3$ | 0.13 | −17 | 1.1 | 86 | 4 | 4 |
| Example 4 | 100 | 10 | 90 | $7.0 \times 10^2$ | 0.02 | −5 | 0.15 | 90 | 4 | 3 |
| Example 5 | 100 | 100 | 50 | $9.0 \times 10^2$ | 0.03 | −5 | 0.36 | 86 | 4 | 4 |
| Comparative Example 3 | 100 | 0 | 50 | $3.0 \times 10^3$ | 0.12 | | | 92 | 2 | 1 |
| Comparative Example 4 | 100 | 0 | 150 | $6.7 \times 10^3$ | 0.09 | | | 87 | 1 | 1 |

TABLE 1-continued

| | Polyolefin | | | | | Tan δ peak | | | Whitening on bending | |
| | resin (Part by weight) | HCR** (Part by weight) | EAC** (Part by weight) | η*(1) (poise) | n | Peak temp. (° C.) | Peak intensity | Flexibility | 500 g | 1000 g |
|---|---|---|---|---|---|---|---|---|---|---|
| Comparative Example 5 | 100 | 4 | 96 | $7.0 \times 10^2$ | 0.02 | −5 | 0.14 | 90 | 2 | 2 |

Notes:
**HCR: Hydrogenated conjugated diene based copolymer rubber,
**EAC: Ethylene α-olefin copolymer rubber
***Total amount of EAC includes the amount of crosslinking agent and crosslinking aid (Examples 1 ~ 4).

Example 6

(Production of thermoplastic elastomer composition pellets)

A propylene-ethylene random copolymer resin [ethylene unit content=4.5% by weight, MFR=228 g/10 min., peak temperature of tan δ peak=−2° C., peak intensity=0.2] (100 parts by weight) and as a hydrogenated conjugated diene copolymer rubber, a hydrogenated butadiene-styrene polymer (styrene unit content=10% by weight, hydrogenation rate=99%, complex dynamic viscosity η*(1)=8.3×10³ poise, Newtonian viscosity index n=0.16, MFR=10 g/10 min., proportion of hydrogenated conjugated diene units having a side chain of at least two carbon atoms to hydrogenated total conjugated diene units=71%, peak temperature of tan δ peak=−22° C., peak intensity=1.5) (100 parts by weight) were fed in a 30 mm φ extruder, kneaded at 160° C. The molten mixture was extruded from a die (temperature=160° C.) having a discharge opening with a diameter of 1.0 mm at a discharge rate of 1 kg/hour/opening, and then an extruded strand was drawn at a haul-off rate of 32 m/min. and cooled to obtain a strand having a diameter of 0.8 mm. The strand was cut to obtain thermoplastic elastomer composition pellet having a sphere-reduced average diameter of 0.91 mm and a bulk specific gravity of 0.47 (complex dynamic viscosity η*(1)=2.0×10³ poise, Newtonian viscosity index n=0.05, peak temperature of new tan δ peak=−17° C., intensity=1.1). (Production of molded article by slush molding)

The resulting thermoplastic elastomer composition pellet 3 was charged into a container 2, and then the container 2 and a mold 1 for slush molding were integrated with mating peripheries of their openings closely (FIG. 1).

Figure 2:
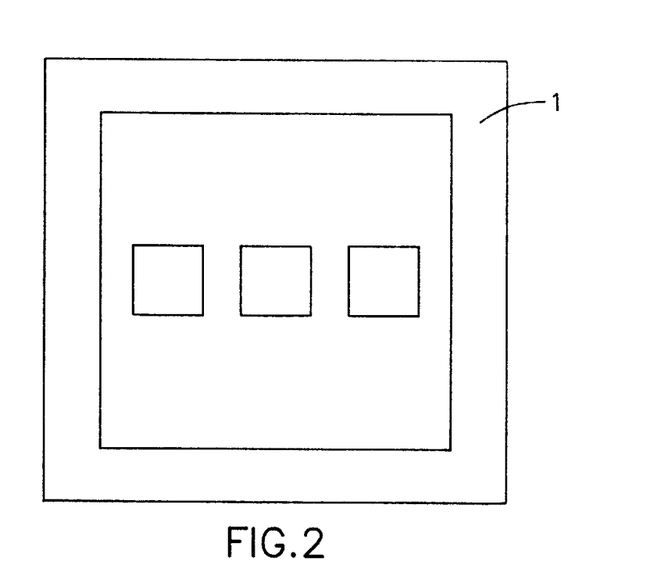
FIG. 2 is a plain view of a mold for slush molding.

The mold 1 had three depressed portions having depths of 7 mm, 11 mm and 15 mm, respectively, and a width of 25 mm each, and all molding surfaces had leather grain decorations. The mold was heated to 250° C.

Then, the integrated container 2 and mold 1 were rotated by 180° using an uniaxial rotator to supply the pellet 3 onto the molding surface of the mold 1 and further reciprocated at an amplitude of ±45° over 15 seconds for two rounds to adhere the pellets to the molding surfaces of the mold 1. After stopping the reciprocation, the integrated container 2 and the mold were rotated by 180° to the original position, whereby the pellet was recharged into the container 2.

Thereafter, the mold 1 was detached from the container 2 and heated in an oven at 250° C. for 2 minutes, followed by cooling. Then, the molded article was released from the mold.

Figure 3:
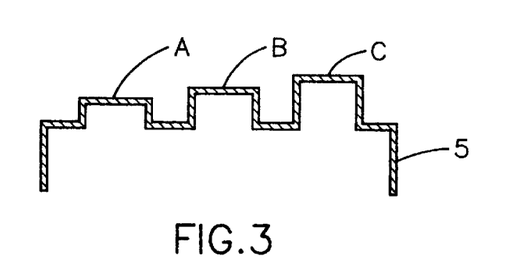
FIG. 3 is a cross sectional view of a molded article.

This molded article 5 had a thickness of 1.2 mm, and three protrusions with heights of 7 mm, 11 mm and 15 mm, respectively, and a width of 25 mm each. On the surface of the article, the leather grain decoration was exactly transferred.

Evaluation results of the thermoplastic elastomer composition, the pellet and the molded article are shown in Table 2.

Comparative Example 6

To 25 parts by weight of EPDM (propylene unit content=28% by weight, iodine value=12), 25 parts by weight of a mineral oil base softener (DIANA PROCESS (trademark) PW-380 manufactured by Idemitsu Kosan Co., Ltd.) was added to obtain an oil-extended EPDM. The oil-extended EPDM and a propylene-ethylene random copolymer resin (ethylene unit content=4.5% by weight, MFR=90 g/10 min., peak temperature of tan δ=−2° C., peak intensity=0.2) (50 parts by weight) and a bismaleimide compound as a crosslinking aid (SUMIFINE (trademark) BM manufactured by Sumitomo Chemical Co., Ltd.) (0.6 part by weight) were kneaded by a Banbury mixer for 10 minutes to obtain a master batch for crosslinking. To the master batch (100 parts by weight), 2,3-dimethyl-2,5-di(t-butylperoxyno)hexane as an organic peroxide (SUNPEROX (trademark) APO manufactured by Sanken Kako Co., Ltd.) (0.4 part by weight) was added and kneaded in a twin-screw extruder at a shear rate of $1.2 \times 10^3$ sec$^{-1}$ and 200° C. to effect dynamic crosslinking to obtain a thermoplastic elastomer composition (complex dynamic viscosity η*(1)=1.5×10³ poise, Newtonian viscosity index n=0.25). The thermoplastic elastomer composition was extruded from the twin-screw extruder and cut by a cutter to obtain granule.

This thermoplastic elastomer composition was charged in a 30 mm φ extruder and then molten. The molten thermoplastic elastomer was extruded from a die (temperature=160° C.) having discharge openings with a diameter of 1.0 mm at a discharge rate of 1 kg/hour/opening, and then an extruded strand was drawn at a haul-off rate of 32 m/min. and cooled to obtain a strand having a diameter of 0.8 mm. The strand was cut by a pelletizer to obtain thermoplastic elastomer composition pellet having a sphere-reduced average particle diameter of 0.91 mm and a bulk specific gravity of 0.47.

In the same manner as in Example 6 except for using the above obtained thermoplastic elastomer composition powder in place of the thermoplastic elastomer composition powder obtained in Example 6, a molded article was obtained.

Evaluation results of the thermoplastic elastomer composition, the pellet and the molded article are shown in Table 2.

Comparative Example 7

The thermoplastic elastomer composition obtained in Comparative Example 6 was cooled to −100° C. using liquid nitrogen and immediately ground in a cooled state to obtain a thermoplastic elastomer composition powder (sphere-reduced average particle diameter=0.20 mm, bulk specific gravity=0.29) which passed a Tyler standard sieve of 32 mesh (opening of 500 μm×500 μm). In the same manner in Example 6 except for using this thermoplastic elastomer composition pellet, a molded article was obtained.

Evaluation results of the thermoplastic elastomer composition and the molded article are shown in Table 2.

Reference Example 3

To EPDM ($ML_{1+4}(100°$ C.)=242, propylene unit content=28% by weight, iodine value=12) (25 parts by weight), the same weight of a mineral oil base softener (DIANA PROCESS (trademark) PW-380 manufactured by Idemitsu Kosan Co., Ltd.) was added to obtain an oil-extended EPDM ($ML_{1+4}(100°$ C.)=53). The oil-extended EPDM and a propylene-ethylene random copolymer resin (ethylene unit content=4.5% by weight, MFR=90 g/10 min., peak temperature of tan $\delta$=−2° C., peak intensity=0.2) (50 parts by weight) and a bismaleimide compound as a crosslinking aid (SUMIFINE (trademark) BM manufactured by Sumitomo Chemical Co., Ltd.) (0.6 parts by weight) were kneaded by a Banbury mixer for 10 minutes to obtain a master batch for crosslinking.

To the master batch for crosslinking (100 parts by weight), 2,3-dimethyl-2,5-di(t-butylperoxyno)hexane as an organic peroxide (SUNPEROX (trademark) APO manufactured by Sanken Kako Co., Ltd.) (0.4 parts by weight) was added and kneaded in a twin-screw extruder at a shear rate of $1.2 \times 10^3$ $sec^{-1}$ and 200° C. to effect dynamic crosslinking to obtain a thermoplastic elastomer composition (complex dynamic viscosity $\eta*(1)=1.5 \times 10^3$ poise, Newtonian viscosity index n=0.25).

Example 7

100 parts by weight of the crosslinked thermoplastic elastomer obtained in Reference Example 3 and, as a hydrogenated conjugated diene copolymer rubber and 20 parts by weight of a hydrogenated butadiene-styrene polymer (styrene unit content=10% by weight, hydrogenation rate=99%, complex dynamic viscosity $\eta*(1)=8.3 \times 10^3$ poise, Newtonian viscosity index n=0.16, MFR=10 g/10 min., proportion of hydrogenated conjugated diene units having a side chain of at least two carbon atoms to hydrogenated total conjugated diene units=71%, peak temperature of ten $\delta$ peak=−22° C., peak intensity=1.5) were charged in a 30 mm $\phi$ extruder, and kneaded at 160° C. The molten mixture was extruded from a die (temperature=160° C.) having a discharge opening with a diameter of 1.0 mm at a discharge rate of 1 kg/hour/opening, and then an extruded strand was drawn at a haul-off rate of 32 m/min. and cooled to obtain a strand having a diameter of 0.8 mm. The strand was cut by a pelletizer to obtain thermoplastic elastomer composition pellet having a sphere-reduced average diameter of 0.90 mm and a bulk specific gravity of 0.47 [complex dynamic viscosity $\eta*(1)=1.0 \times 10^3$ poise, Newtonian viscosity index n=0.15, peak temperature of new tan $\delta$ peak=−17° C., intensity=1.5]. In the same manner as in Example 6 except for using this thermoplastic elastomer composition pellet, a molded article was obtained.

Evaluation results of the thermoplastic elastomer composition, the pellet and the molded article are shown in Table 2.

Reference Example 4

66.7 parts by weight of a propylene-ethylene random copolymer resin (ethylene unit content=4.5% by weight, NMR=228 g/10 min.) and 33.3 parts by weight of an ethylene-propylene random copolymer rubber (ESPRENE V0141 manufactured by Sumitomo Chemical Co., Ltd., propylene unit content=27% by weight, MFR=1 g/10 min.) were kneaded in a twin-screw extruder at a shear rate of $1.2 \times 10^3$ $sec^{-1}$ and 200° C. to obtain a composition (complex dynamic viscosity $\eta*(1)=3.0 \times 10^3$ poise, Newtonian viscosity coefficient n: 0.12).

Example 8

100 parts by weight of the thermoplastic elastomer obtained in Reference Example 3 and 66.7 parts by weight of, as a hydrogenated conjugated diene copolymer rubber, a hydrogenated butadiene-styrene polymer (styrene unit content=10% by weight, hydrogenation rate=99%, complex dynamic viscosity $\eta*(1)=8.3 \times 10^3$ poise, Newtonian viscosity index n=0.16, MFR=10 g/10 min., proportion of hydrogenated conjugated diene units having a side chain of at least two carbon atoms to hydrogenated total conjugated diene units=71%, peak temperature of tan $\delta$ peak=−22° C., peak intensity=1.5) were charged in a 30 mm $\phi$ extruder, and kneaded at 160° C. The resulting molten mixture was extruded from a die (temperature=160° C.) having a discharge opening with a diameter of 1.0 mm at a discharge rate of 0.8 kg/hour/opening, and then an extruded strand was drawn at a haul-off rate of 35 m/min. and cooled to obtain a strand having a diameter of 0.8 mm. The strand was cut by a pelletizer to obtain thermoplastic elastomer composition pellet having a sphere-reduced average particle diameter of 0.8 mm and a bulk specific gravity of 0.46 [complex dynamic viscosity $\eta*(1)=2.7 \times 10^3$ poise, Newtonian viscosity index n=0.13, peak temperature of new tan $\delta$ peak=−17° C. intensity=1.1]. In the same manner as in Example 6 except for using this thermoplastic elastomer composition pellet, a molded article was obtained.

Evaluation results of the thermoplastic elastomer composition, the pellet and the molded article are shown in Table 2.

Example 9

A propylene-ethylene random copolymer resin [ethylene unit content=4.5% by weight, MFR=228 g/10 min., peak temperature of tan $\delta$ peak=−2° C., peak intensity=0.2] (100 parts by weight), as a hydrogenated conjugated diene copolymer rubber, a hydrogenated butadiene-styrene copolymer (styrene unit content=10% by weight, hydrogenation rate=99%, complex dynamic viscosity $\eta*(1)=8.3 \times 10^3$ poise, Newtonian viscosity index n=0.16, MFR=10 g/10 min., proportion of hydrogenated conjugated diene units having a side chain of at least two carbon atoms to hydrogenated total conjugated diene units=71%, peak temperature of tan $\delta$ peak=−22° C., peak intensity=1.5) (10 parts by weight), and an ethylene-hexene copolymer rubber (Engage 8400, hexene content=25% by weight, MFR=30 g/10 min., manufactured by dow Chemical Co., Ltd.) (90 parts by weight) were kneaded in a twin screw extruder at a temperature of 200° C., at a share rate of $1.2 \times 10^3$ $sec^{-1}$ to obtain a composition (complex dynamic viscosity $\eta*(1)=7 \times 10^2$ poise, n=0.02), then the composition was formed into pellet, and thereafter, a molded article was obtained in the same manner as in Example 6 except that this composition was used.

Evaluation results of the thermoplastic elastomer composition, the pellet and the molded article are shown in Table 2.

Example 10

A propylene-ethylene random copolymer resin [ethylene unit content=4.5% by weight, MFR=228 g/10 min., peak temperature of tan δ peak=−2° C., peak intensity=0.2] (100 parts by weight), as a hydrogenated conjugated diene copolymer rubber, a hydrogenated butadiene-isoprene-styrene copolymer(styrene unit content=15% by weight, hydrogenation rate=95%, complex dynamic viscosity $\eta*(1)=6\times10^2$ poise, Newtonian viscosity index n=0.02, MFR=65 g/10 min., proportion of hydrogenated conjugated diene units having a side chain of at least two carbon atoms to hydrogenated total conjugated diene units=60%, peak temperature of tan δ peak=−11° C., peak intensity=1.8) (100 parts by weight), and an ethylene-propylene copolymer rubber [SPO V0141 manufactured by Sumitomo Chemical Co., Ltd., propylene unit content=27% by weight, MFR=1 g/10 min.] (50 parts by weight) were kneaded in a twin screw extruder at a temperature of 200° C., at a share rate of $1.2\times10^3$ sec$^{-1}$ to obtain a composition (complex dynamic viscosity $\eta*(1)=9\times10^2$ poise, n=0.03). Then, pellet of the composition was obtained, and a molded article was obtained in the same manner as in Example 1.

Evaluation results of the thermoplastic elastomer composition, the pellet and the molded article are shown in Table 2.

Comparative Example 8

A propylene-ethylene random copolymer resin [ethylene unit content=4.5% by weight, MFR=228 g/10 min., peak temperature of tan δ peak=−2° C., peak intensity=0.2] (100 parts by weight), as a hydrogenated conjugated diene copolymer rubber, a hydrogenated butadiene-styrene copolymer(styrene unit content=10% by weight, hydrogenation rate=99%, complex dynamic viscosity $\eta*(1)=8.3\times10^3$ poise, Newtonian viscosity index n=0.16, MFR=10 g/10 min., proportion of hydrogenated conjugated diene units having a side chain of at least two carbon atoms to hydrogenated total conjugated diene units=71%, peak temperature of tan δ peak=−22° C., peak intensity=1.5) (4 parts by weight), and an ethylene-hexene copolymer rubber (Engage 8400, hexene content=25% by weight, MFR=30 g/10 min., manufactured by Dow Chemical Co., Ltd.) (96 parts by weight) were kneaded in a twin screw extruder at a temperature of 200° C., at a share rate of $1.2\times10^3$ sec$^{-1}$ to obtain a composition (complex dynamic viscosity $\eta*(1)=7\times10^2$ poise, n=0.02), then the composition was formed into pellet, and thereafter, a molded article was obtained in the same manner as in Example 6 except that this composition was used.

Evaluation results of the thermoplastic elastomer composition, the pellet and the molded article are shown in Table 2.

TABLE 2

| | Polyolefin resin (Part by weight) | HCR** (Part by weight) | EAC** (Part by weight) | $\eta*(1)$ (poise) | n | Tan δ peak Peak temp. (° C.) | Tan δ peak Peak intensity | Sphere-reduced average particle size | bulk specific gravity | Flexibility | Whitening on bending 500 g | Whitening on bending 1000 g | Appearance of molded article |
|---|---|---|---|---|---|---|---|---|---|---|---|---|---|
| Example 6 | 100 | 100 | 0 | $2.0\times10^3$ | 0.05 | −17 | 1.1 | 0.91 | 0.47 | 88 | 4 | 4 | 4 |
| Comparative Example 6 | 100 | 0 | 101*** | $1.5\times10^3$ | 0.25 | | | 0.91 | 0.47 | 92 | 2 | 2 | 4 |
| Comparative Example 7 | 100 | 0 | 101*** | $1.5\times10^3$ | 0.25 | | | 0.20 | 0.29 | 92 | 2 | 2 | 2 |
| Example 7 | 100 | 40.2 | 101*** | $1.0\times10^3$ | 0.15 | −17 | 1.5 | 0.90 | 0.47 | 88 | 4 | 4 | 4 |
| Example 8 | 100 | 100 | 50 | $2.7\times10^3$ | 0.13 | −17 | 1.1 | 0.80 | 0.46 | 86 | 4 | 4 | 4 |
| Example 9 | 100 | 100 | 50 | $9.0\times10^2$ | 0.03 | −5 | 0.36 | 0.80 | 0.45 | 86 | 4 | 4 | 4 |
| Example 10 | 100 | 10 | 90 | $7.0\times10^2$ | 0.02 | −5 | 0.15 | 0.85 | 0.46 | 90 | 4 | 3 | 4 |
| Comparative Example 8 | 100 | 4 | 96 | $7.0\times10^2$ | 0.02 | −5 | 0.14 | 0.85 | 0.46 | 90 | 3 | 2 | 4 |

Notes:
**HCR: Hydrogenated conjugated diene based copolymer rubber,
**EAC: Ethylene α-olefin copolymer rubber
***Total amount of EAC includes the amount of crosslinking agent and crosslinking aid (Comparative Example 6 ~ 7, Examples 7).

What is claimed is:

1. A powder of a thermoplastic elastomer composition, suitable for powder molding, comprising 100 parts by weight of a polyolefin resin whose crystallinity is at least 50%, 5 to 250 parts by weight a rubbery polymer comprising conjugated diene based elastomers in which the proportion of the number of hydrogenated conjugated diene units having a side chain with at least two carbon atoms to the total number of hydrogenated conjugated diene units is at least 45%, and 0 to 500 parts by weight of an ethylene-α-olefin copolymer rubber, wherein said thermoplastic elastomer composition has a specific tan δ peak, the peak temperature of which is different from that of the polyolefin resin and that of the rubbery polymer at a temperature within the range from −70 to 30° C. in a temperature dependence curve of tan δ determined by solid dynamic viscoelasticity measurement and has a complex dynamic viscosity $\eta*5(1)$ at 250° C. of $1.5\times10^5$ poise or less and a Newtonian viscosity index n of 0.67 or less.

2. The powder of a thermoplastic elastomer composition according to claim 1, wherein the hydrogenated conjugated diene based rubber polymer is a hydrogenated product of a copolymer rubber of a conjugated diene and a vinyl monomer selected from the group consisting of aromatic vinyl compounds, vinyl ester compounds, ethylenically unsaturated carboxylic acid esters and vinyl nitriles.

3. The powder of a thermoplastic elastomer composition according to claim 2, wherein the content of the vinyl monomer unit in the copolymer rubber of the conjugated diene and other monomer is 50% by weight of less.

4. The powder of a thermoplastic elastomer composition according to claim 1, wherein the peak temperature of the specific tan δ peak is lower than the tan δ peak temperature of the polyolefin resin.

5. The powder of a thermoplastic elastomer composition according to claim 1, wherein the melt flow rate of the rubbery polymer is at least 5 g/10 min.

6. The powder of a thermoplastic elastomer composition according to claim 1, wherein the proportion of the number of hydrogenated conjugated diene units having a side chain with at least two carbon atoms to the total number of hydrogenated conjugated diene units is 60 to 95%.

* * * * *